(12) United States Patent
Mizutani (10) Patent No.: US 10,162,188 B2
(45) Date of Patent: Dec. 25, 2018

(54) DIFFRACTIVE OPTICAL ELEMENT AND OPTICAL SYSTEM HAVING THE SAME, AND IMAGE PICKUP APPARATUS

(71) Applicant: CANON KABUSHIKI KAISHA, Tokyo (JP)

(72) Inventor: Yui Mizutani, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/648,756

(22) Filed: Jul. 13, 2017

(65) Prior Publication Data

US 2018/0045975 A1    Feb. 15, 2018

(30) Foreign Application Priority Data

Aug. 9, 2016  (JP) .................. 2016-156964

(51) Int. Cl.
  *G02B 27/42* (2006.01)
  *G02B 1/04* (2006.01)
  *G02B 5/18* (2006.01)

(52) U.S. Cl.
  CPC .......... *G02B 27/4272* (2013.01); *G02B 1/04* (2013.01); *G02B 5/1814* (2013.01); *G02B 5/1866* (2013.01); *G02B 27/4205* (2013.01)

(58) Field of Classification Search
  CPC .... G02B 27/4272; G02B 1/04; G02B 5/1814; G02B 5/1866; G02B 27/4205

USPC ......................................................... 359/356
See application file for complete search history.

(56) References Cited

U.S. PATENT DOCUMENTS

| | | | |
|---|---|---|---|
| 8,605,358 B2 * | 12/2013 | Ushigome ............ | G02B 5/1814 359/569 |
| 2012/0087008 A1 * | 4/2012 | Ushigome ............ | G02B 5/1895 359/576 |
| 2012/0262788 A1 * | 10/2012 | Ushigome .............. | B82Y 20/00 359/576 |
| 2013/0155514 A1 * | 6/2013 | Ushigome ................ | G02B 5/18 359/571 |

FOREIGN PATENT DOCUMENTS

JP      2015-132710 A      7/2015

* cited by examiner

*Primary Examiner* — William R Alexander
*Assistant Examiner* — Grant A Gagnon
(74) *Attorney, Agent, or Firm* — Canon USA Inc, IP Division (57) ABSTRACT

An optical element includes a first diffraction grating and a second diffraction grating. When a refractive index of the first diffraction grating at wavelength $\lambda$ [μm] is $n_1(\lambda)$ and the refractive index of the second diffraction grating at the wavelength $\lambda$ [μm] is $n_2(\lambda)$, $n_1(\lambda)$ and $n_2(\lambda)$ satisfy predetermined conditional expressions.

14 Claims, 11 Drawing Sheets

FIG. 10

DIFFRACTIVE OPTICAL ELEMENT AND OPTICAL SYSTEM HAVING THE SAME, AND IMAGE PICKUP APPARATUS

BACKGROUND OF THE INVENTION

Field of Invention

The present invention relates to a diffractive optical element used for an optical system such as an image pickup apparatus.

Description of Related Art

An image pickup apparatus, such as a night vision camera and a thermographic camera, that forms an image by receiving long wavelength infrared rays is known. Materials used for an infrared lens include ZnSe, ZnS, and chalcogenide glass. These materials have large dispersion of the refractive index and thus, it is necessary to correct chromatic aberration.

Japanese Patent Application Laid-Open No. 2015-132710 discusses a diffractive optical element in which a diffraction grating is formed on an optical surface of a lens made of one of ZnSe, ZnS, and chalcogenide glass. Also, filling unevenness of the diffraction grating with a coating layer made of polyethylene to protect the diffraction grating is discussed.

An image pickup apparatus for long wavelength infrared rays uses light of the wavelength band of about 8 to 14 micrometers (μm) (hereinbelow, referred to as the long wavelength infrared region). For this reason, if the diffraction efficiency for a specific diffraction order in a diffractive optical element is low in a region of the long wavelength infrared region, diffracted light of an unnecessary diffraction order for imaging may be generated. This diffracted light of an unnecessary diffraction order tends to cause flare artifacts, and therefore is not desirable.

With the diffractive optical element discussed in Japanese Patent Application Laid-Open No. 2015-132710, high diffraction efficiency is obtained in a region of wavelengths of the long wavelength infrared region, but it is difficult to obtain high diffraction efficiency at other wavelengths of the long wavelength infrared region.

SUMMARY OF THE INVENTION

The present invention is directed to a diffractive optical element capable of improving diffraction efficiency across all wavelengths of the long wavelength infrared region.

According to an aspect of the present invention, a diffractive optical element includes a first diffraction grating and a second diffraction grating, wherein when a refractive index of the first diffraction grating at a wavelength $\lambda$ [μm] is $n_1(\lambda)$ and the refractive index of the second diffraction grating at the wavelength $\lambda$ [μm] is $n_2(\lambda)$, a conditional expression $$-50<[n_1(10)-n_2(10)]/\{n_1(8)-n_2(8)-[n_1(12)-n_2(12)]\}<-1.3$$

is satisfied.

According to another aspect of the present invention, a diffractive optical element includes a first diffraction grating and a second diffraction grating, wherein when a refractive index of the first diffraction grating at wavelength $\lambda$ [μm] is $n_1(\lambda)$ and the refractive index of the second diffraction grating at the wavelength $\lambda$ [μm] is $n_2(\lambda)$, conditional expressions $$0.616<[n_1(8)-n_2(8)]/[n_1(10)-n_2(10)]<0.984$$

$$0.924<[n_1(12)-n_2(12)]/[n_1(10)-n_2(10)]<1.476$$

are satisfied.

Further features of the present invention will become apparent from the following description of exemplary embodiments with reference to the attached drawings.

DESCRIPTION OF THE EMBODIMENTS

Exemplary embodiments of the present invention will be described with reference to the drawings.

Figure 1A:
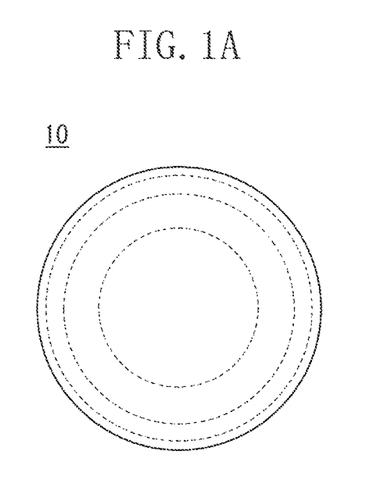
FIGS. 1A and 1B are schematic diagrams of a diffractive optical element.
Figure 1B:
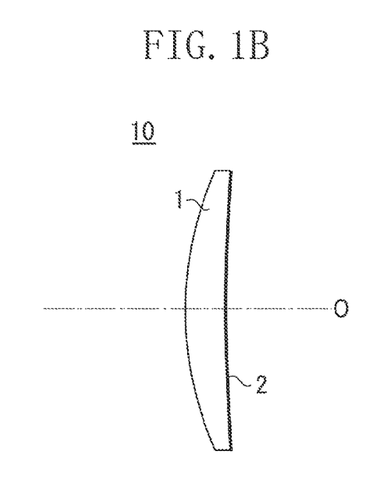

Each of FIGS. 1A and 1B is a schematic diagram illustrating a diffractive optical element (hereinbelow, referred to as "DOE") 10 according to a first exemplary embodiment. In FIG. 1A, concentric circles illustrated by dotted lines schematically represent a grating shape of a diffraction grating portion 2 described below.

FIG. 1B is a sectional view of the DOE 10. The DOE 10 includes a substrate 1 and the diffraction grating portion 2. O illustrated in FIG. 1B represents the center axis of the DOE 10. When the DOE 10 according to the present exemplary embodiment is used for an optical system such as an image pickup apparatus, the DOE 10 is arranged such that the center axis O and the optical axis of the optical system match.

Figure 2:
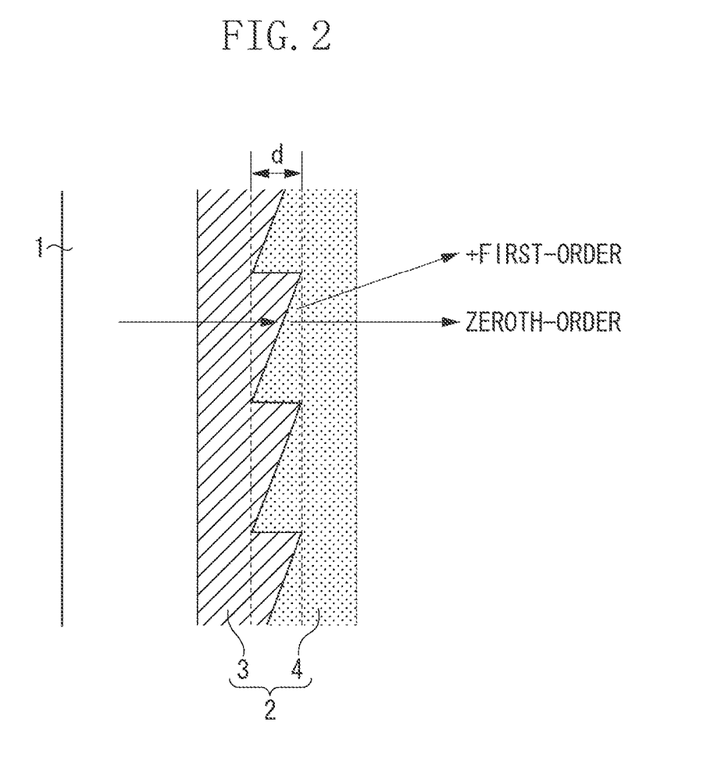
FIG. 2 is an enlarged view of a diffraction grating portion of the diffractive optical element.

An enlarged view of the diffraction grating portion 2 is illustrated in FIG. 2. FIG. 2 schematically illustrates the diffraction grating portion 2, and dimensions illustrated in FIG. 2 are different from actual dimensions. The diffraction grating portion 2 is constructed by stacking a first diffraction grating 3 and a second diffraction grating 4.

As illustrated in FIG. 2, the first diffraction grating 3 and the second diffraction grating 4 according to the present exemplary embodiment are stacked onto each other in close contact. The first diffraction grating 3 and the second diffraction grating 4 are diffraction gratings in a sawtooth shape (blaze structure). By adopting the blazed diffraction gratings for the first diffraction grating 3 and the second diffraction grating 4, diffraction efficiency of a specific diffraction order can be optimized to achieve maximum efficiency.

In this case, the distance between an envelope connecting valley portions of the first diffraction grating 3 and an envelope connecting peak portions of the first diffraction grating 3 in the DOE 10 is a grating thickness d of the diffraction grating portion 2.

An example in which the first diffraction grating 3 and the second diffraction grating 4 are stacked in close contact is illustrated in FIG. 2, but the first diffraction grating 3 and the second diffraction grating 4 may also be stacked with a space therebetween without being brought into close contact with each other.

A plurality of circles illustrated by dotted lines in FIG. 1A represents the grating peaks of the first diffraction grating 3 or the grating valleys of the second diffraction grating 4. As illustrated in FIG. 1A, the diffraction grating portion 2 includes concentric diffraction gratings arranged at a different pitch.

By gradually changing grating pitches of the diffraction grating with an increasing distance from the center of the concentric diffraction gratings, the diffraction grating portion 2 can be made to include the diffractive properties of a lens (convergence action and divergence action of light).

When the refractive index of the first diffraction grating 3 at wavelength $\lambda$ [μm] is $n_1(\lambda)$ and the refractive index of the second diffraction grating 4 at wavelength $\lambda$ [μm] is $n_2(\lambda)$, the DOE 10 according to the present exemplary embodiment satisfies the following conditional expression (1) to improve diffraction efficiency in the long wavelength infrared region:

$$-50 < \frac{n_1(10) - n_2(10)}{n_1(8) - n_2(8) - (n_1(12) - n_2(12))} < -1.3 \quad (1)$$

The reason why diffraction efficiency in the long wavelength infrared region can be improved by satisfying the formula (1) will be described.

In the DOE 10, the condition for the maximum diffraction efficiency of m-th order diffracted light is given by the following formula (2):

$$[n_1(\lambda) - n_2(\lambda)] \times d = m\lambda \quad (2)$$

The left side of the formula (2) represents the maximum value of an optical path length difference generated by the diffraction grating portion 2. m in the formula (2) is the diffraction order and takes any integer value. More specifically, the maximum diffraction efficiency is achieved when the optical path length difference generated by the diffraction grating portion 2 is an integral multiple of the wavelength. The diffraction efficiency ηHA) can be calculated by the following formula (3):

$$\eta(\lambda) = \text{sinc}^2[\pi\{m - (n_1(\lambda) - n_2(\lambda)) \times d/\lambda\}] \quad (3)$$

In the formula (3), sinc(x) is a function represented by $\{\sin(x)/x\}$.

For this reason, if the optical path length difference at each wavelength of the long wavelength infrared region is an integral multiple of the wavelength, diffraction efficiency in the long wavelength infrared region can be improved. The following formulas (4) to (6) are considered by setting the representative wavelength of the long wavelength infrared region to $\lambda = 8$ μm, 10 μm, 12 μm:

$$[n_1(8) - n_2(8)] \times d = \Phi(\lambda_8)\lambda_8 \quad (4)$$

$$[n_1(10) - n_2(10)] \times d = \Phi(\lambda_{10})\lambda_{10} \quad (5)$$

$$[n_1(12) - n_2(12)] \times d = \Phi(\lambda_{12})\lambda_{12} \quad (6)$$

In the formulas (4) to (6), the subscript of $\lambda$ represents the wavelength in micrometers. $\Phi(\lambda)$ on the right side of the formulas (4) to (6) is a ratio of the optical path length difference at each wavelength and the wavelength. Normally, d is defined in such a manner that $\Phi(\lambda_8)$, $\Phi(\lambda_{10})$, and $\Phi(\lambda_{12})$ are each any integer value or a value close to the integer value to improve diffraction efficiency of any diffraction order.

The following relational expression (7) can be obtained by calculating a difference between the formula (4) and the formula (6):

$$\{n_1(8) - n_2(8) - [n_1(12) - n_2(12)]\}d = \Phi(\lambda_8)\lambda_8 - \Phi(\lambda_{12})\lambda_{12} \quad (7)$$

Next, the relational expression (8) from which d is eliminated can be obtained by dividing the formula (5) by the formula (7):

$$\frac{n_1(10) - n_2(10)}{n_1(8) - n_2(8) - (n_1(12) - n_2(12))} = \frac{\Phi(\lambda_{10})\lambda_{10}}{\Phi(\lambda_8)\lambda_8 - \Phi(\lambda_{12})\lambda_{12}} \quad (8)$$

With $\Phi(\lambda_8) = \Phi(\lambda_{10}) = \Phi(\lambda_{12})$ in the formula (8), diffraction efficiency at each wavelength in the long wavelength infrared region can be maximally improved. In this case, the right side of the formula (8) is $\lambda_{10}/(\lambda_8 - \lambda_{12}) = -2.5$, which is a value corresponding to the Abbe number of the diffraction grating portion 2 in the long wavelength infrared region.

Therefore, it is desirable to form the first diffraction grating 3 and the second diffraction grating 4 by combining materials to satisfy $\Phi(\lambda_8) = \Phi(\lambda_{10}) = \Phi(\lambda_{12})$. However, even if there are slight differences among $\Phi(\lambda_8)$, $\Phi(\lambda_{10})$, and $\Phi(\lambda_{12})$, sufficiently high diffraction efficiency can be achieved. In view of the relation between the $\Phi$ values of $\Phi(\lambda_8)$, $\Phi(\lambda_{10})$ and $(\lambda_{12})$), and diffraction efficiency, an appropriate relation between $n_1(\lambda)$ and $n_2(\lambda)$ for achieving sufficiently high diffraction efficiency in the long wavelength infrared region is found in the formula (1).

The formula (1) has a value in the range of negative values because the right side of the formula (8) has a negative value when $(\lambda_8)$, $(\lambda_{10})$, and $\Phi(\lambda_{12})$ have values close to one another. This shows that one of the first diffraction grating 3 and the second diffraction grating 4 is formed from a material of a high refractive index and low dispersion and the other is formed from a material of a low refractive index and high dispersion.

If the absolute value of $\Phi(\lambda_8)$ is larger than the absolute value of $\Phi(\lambda_{12})$, the value of the formula (1) is smaller than −2.5. In this case, diffraction efficiency in the long wavelength infrared region can be made sufficiently high by making the value of the formula (1) larger than the lower limit thereof. If the absolute value of $\Phi(\lambda_8)$ is smaller than the absolute value of $\Phi(\lambda_{12})$, the value of the formula (1) is larger than −2.5. In this case, diffraction efficiency in the long wavelength infrared region can be made sufficiently high by making the value of the formula (1) smaller than the upper limit thereof.

If the upper limit or the lower limit of the formula (1) is not satisfied, high diffraction efficiency can be achieved in a region of the wavelengths in the long wavelength infrared region by appropriately designing the grating thickness d, but it is difficult to achieve high diffraction efficiency at other wavelengths.

It is preferable that the upper limit of the formula (1) is set to −1.5 and the lower limit of the formula (1) is set to −10.

Diffraction efficiency in the long wavelength infrared region can be improved by satisfying both of the following conditional expressions (9) and (10):

$$0.77 < \Phi(\lambda_8)/\Phi(\lambda_{10}) < 1.23 \quad (9)$$

$$0.77 < \Phi(\lambda_{12})/\Phi(\lambda_{10}) < 1.23 \quad (10)$$

The formulas (9) and (10) show that $\Phi(\lambda_8)$, $\Phi(\lambda_{10})$, and $\Phi(\lambda_{12})$ are mutually close values. If the ratio of $\Phi(\lambda_8)$ and $\Phi(\lambda_{10})$ is within the range of the formula (9) and the ratio of $\Phi(\lambda_{12})$ and $\Phi(\lambda_{10})$ is within the range of the formula (10), diffraction efficiency in the long wavelength infrared region can sufficiently be improved.

Using the formulas (4) to (6), a formula (9a) equivalent to the formula (9) and a formula (10b) equivalent to the formula (10) can be obtained. As a result, diffraction efficiency in the long wavelength infrared region can be improved by the conditional expression (9a) and the conditional expression (10a) being satisfied by the refractive index $n_1(\lambda)$ at the wavelength A [μm] of the first diffraction grating 3 and the refractive index $n_2(\lambda)$ at the wavelength $\lambda$ [μm] of the second diffraction grating 4:

$$0.616 < [n_1(8) - n_2(8)]/[n_1(10) - n_2(10)] < 0.984 \quad (9a)$$

$$0.924 < [n_1(12) - n_2(12)]/[n_1(10) - n_2(10)] < 1.476 \quad (10a)$$

Figure 3:
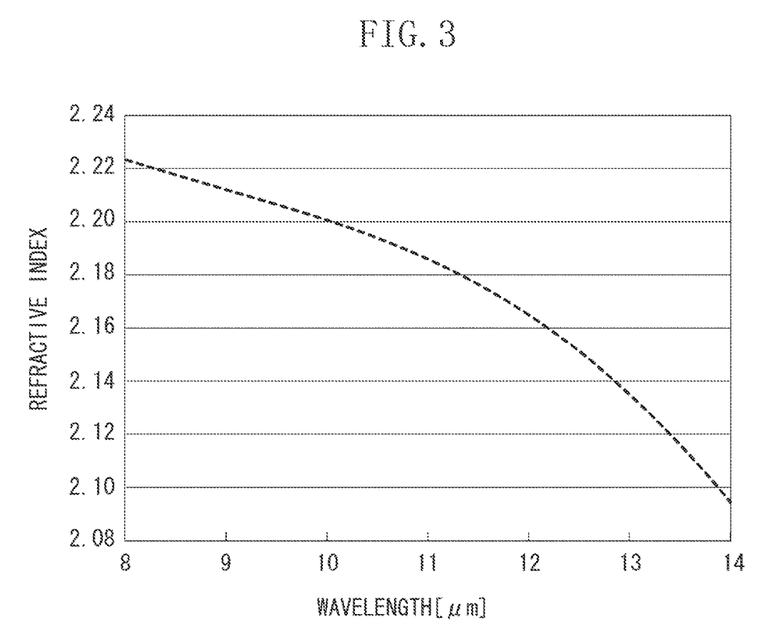
FIG. 3 is a diagram illustrating wavelength dependency of a refractive index of ZnS.

In the above description, the diffraction efficiency at the wavelengths of 8 μm, 10 μm, and 12 μm in the long wavelength infrared region is considered. However, many materials used in the long wavelength infrared region have the refractive index that significantly changes on the long wavelength side. The wavelength dependency of the refractive index of ZnS as an example of the material used in the long wavelength infrared region is illustrated in FIG. 3. As illustrated in FIG. 3, a change of the refractive index of ZnS with respect to the wavelength of ZnS increases with an increasing wavelength.

In order to further improve diffraction efficiency in the long wavelength infrared region, it is desirable to consider changes of the refractive indexes of the first diffraction grating 3 and the second diffraction grating 4 in a bandwidth of longer wavelengths (12 to 13 μm). An optical path length difference at the wavelength 13 μm in the diffraction grating portion 2 given by the following formula (11) is considered:

$$[n_1(13) - n_2(13)] \times d = \Phi(\lambda_{13})\lambda_{13} \quad (11)$$

In the formula (11), the subscript of $\lambda$ represents the wavelength. $\Phi(\lambda_{13})$ is the ratio of the optical path length difference and the wavelength at the wavelength 13 μm.

A relational expression (12) from which d is eliminated can be obtained by dividing the difference between the formula (6) and the formula (11) by the difference between the formula (4) and the formula (6):

$$\frac{n_1(12) - n_2(12) - (n_1(13) - n_2(13))}{n_1(8) - n_2(8) - (n_1(12) - n_2(12))} = \frac{\Phi(\lambda_{12})\lambda_{12} - \Phi(\lambda_{13})\lambda_{13}}{\Phi(\lambda_8)\lambda_8 - \Phi(\lambda_{12})\lambda_{12}} \quad (12)$$

With $\Phi(\lambda_8) = \Phi(\lambda_{12}) = \Phi(\lambda_{13})$ in the formula (12), diffraction efficiency can maximally be improved also in the wavelength band (12 to 13 μm) on the long wavelength side of the long wavelength infrared region. In this case, the right side of the formula (12) is $(\lambda_{12} - \lambda_{13})/(\lambda_8 - \lambda_{12})$, which is a value corresponding to a relative partial dispersion ratio of the diffraction grating portion 2 at the wavelengths 12 to 13 μm.

Therefore, diffraction efficiency in the long wavelength infrared region can be improved by bringing the value of the formula (12) closer to $(\lambda_{12} - \lambda_{13})/(\lambda_8 - \lambda_{12})$. However, since materials that can be used in the long wavelength infrared region are limited, it is difficult to form the DOE 10 by combining materials satisfying the formula (1) and bringing the value of the formula (12) closer to $(\lambda_{12} - \lambda_{13})/(\lambda_8 - \lambda_{12})$. Similarly, it is difficult to form the DOE 10 by combining materials satisfying the formulas (9) and (10) and bringing the value of the formula (12) closer to $(\lambda_{12} - \lambda_{13})/(\lambda_8 - \lambda_{12})$.

However, diffraction efficiency in the long wavelength infrared region can further be improved by appropriately setting the relationship between the value of the formula (8) and the value of the formula (12). For this reason, the DOE 10 satisfies the following conditional expression (13):

$$-20 < \left(\frac{n_1(10) - n_2(10)}{n_1(8) - n_2(8) - (n_1(12) - n_2(12))} + 2.5\right) \times \quad (13)$$
$$\left(\frac{n_1(12) - n_2(12) - (n_1(13) - n_2(13))}{n_1(8) - n_2(8) - (n_1(12) - n_2(12))} - 0.25\right) < 0.37$$

In the formula (13), 2.5 is equal to $-\lambda_{10}/(\lambda_8 - \lambda_{12})$. Also, −0.25 is equal to $-(\lambda_{12} - \lambda_{13})/(\lambda_8 - \lambda_{12})$.

The reason why diffraction efficiency can further be improved by satisfying the formula (13) will be described by focusing on diffraction efficiency of first-order diffracted light. From the formulas (2) and (3), first-order diffraction efficiency of the DOE 10 increases as the value of $\Phi(\lambda)$ (ratio of the optical path length difference and the wavelength) in the formula (14) approaches 1:

$$\Phi(\lambda) = [n_1(\lambda) - n_2(\lambda)] \times d/\lambda \quad (14)$$

In the formula (14), $n_1(\lambda)$ is the refractive index of the first diffraction grating 3 at wavelength A, $n_2(\lambda)$ is the refractive index of the second diffraction grating 4 at wavelength A, and d is the grating thickness of the diffraction grating portion 2.

Figure 4:
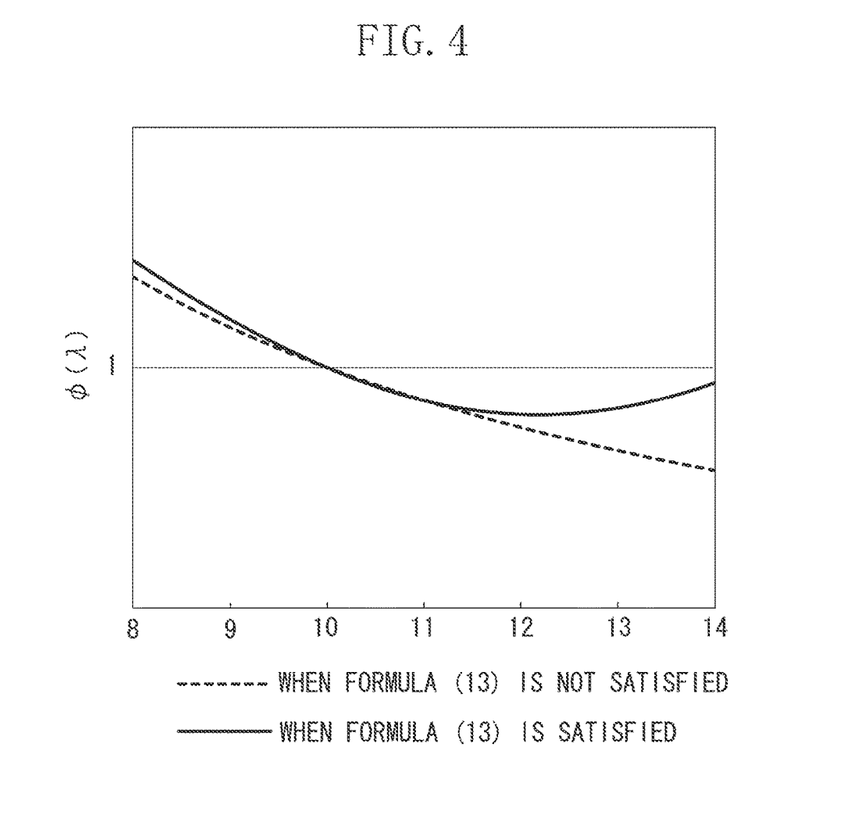
FIG. 4 is a diagram schematically illustrating wavelength dependency of the value of the formula (14).

The wavelength dependency of $\Phi(\lambda)$ is schematically illustrated in FIG. 4. In FIG. 4, a dotted line indicates $\Phi(\lambda)$ when the value of the formula (8) is smaller than $\lambda_{10}/(\lambda_8 - \lambda_{12})$ and does not satisfy the formula (13). In this case, $\Phi(\lambda)$ in the diffraction grating portion 2 tends to decrease with an increasing wavelength.

A solid line in FIG. 4 indicates $\Phi(\lambda)$ when the value of the formula (8) is smaller than $\lambda_{10}/(\lambda_8 - \lambda_{12})$ and satisfies the formula (13). In this case, like the case indicated by the dotted line, $\Phi(\lambda)$ changes so as to decrease with an increasing wavelength at wavelengths 8 to 11 μm. At wavelengths 12 to 14 μm, $\Phi(\lambda)$ changes so as to increase with an increasing wavelength. This is because the value of the formula (12) is adjusted so as to satisfy the formula (13).

In other words, the amount of decrease of the optical path length difference on the long wavelength side can be decreased by satisfying the formula (13) so that diffraction efficiency on the long wavelength side can further be improved. As a result, diffraction efficiency in the long wavelength infrared region can further be improved.

The above description also applies when the value of the formula (8) is larger than $\lambda_{10}/(\lambda_8 - \lambda_{12})$. More specifically, when the value of the formula (8) is larger than $\lambda_{10}/(\lambda_8 - \lambda_{12})$ and does not satisfy the formula (13), the optical path length difference in the diffraction grating portion 2 tends to increase with an increasing wavelength. However, the amount of increase of the optical path length difference on the long wavelength side can be decreased by adjusting the value of the formula (12) so as to satisfy the formula (13) so that diffraction efficiency on the long wavelength side can further be improved. As a result, diffraction efficiency in the long wavelength infrared region can further be improved.

The upper limit of the formula (13) may preferably be set to 0.1. The lower limit of the formula (1) may preferably be set to −10.

Changes of $\Phi(\lambda)$ on the long wavelength side can be corrected by appropriately setting the inclination of $f(\lambda)$ defined as $f(\lambda)=[n_1(\lambda)-n_2(\lambda)]/\lambda$. More specifically, the following conditional expression (15) is preferably satisfied:

$$a_2/a_1 < 1 \tag{15}$$

$a_1$ in the formula (15) is a coefficient of $\lambda$ when $f(\lambda)$ is linearly approximated with respect to $\lambda$ in the wavelength band of 8 μm or more and 12 μm or less. $a_2$ in the formula (15) is a coefficient of $\lambda$ when $f(\lambda)$ is linearly approximated with respect to $\lambda$ in the wavelength band of 12 μm or more and 13 μm or less. The linear approximation is carried out by using the method of least squares.

If $a_1$ and $a_2$ have the same sign, the formula (15) indicates that the inclination of $f(\lambda)$ in the wavelength band of 12 μm or more and 13 μm or less is gentler than the inclination of $f(\lambda)$ in the wavelength band of 8 μm or more and 12 μm or less. This is synonymous with the statement that the inclination of $\Phi(\lambda)$ in the formula (14) is gentler in the wavelength band of 12 μm or more and 13 μm or less than the wavelength band of 8 μm or more and 12 μm or less. In other words, the amount of change of $\Phi(\lambda)$ on the long wavelength side can be decreased by satisfying the formula (15). Therefore, the diffraction efficiency can be inhibited from decreasing due to excessive changes of $\Phi(\lambda)$ on the long wavelength side.

If $a_1$ and $a_2$ have different signs, $f(\lambda)$ has an external value in the wavelength band of 8 μm or more and 13 μm or less. This is synonymous with the statement that $\Phi(\lambda)$ in the formula (14) has an external value in the wavelength band of 8 μm or more and 13 μm or less. If, for example, $a_1$ is negative and $a_2$ is positive, $\Phi(\lambda)$ changes as indicated by the solid line in FIG. 4. Therefore, the width of change of $\Phi(\lambda)$ in the long wavelength infrared region can be made smaller than that in the case where $a_1$ and $a_2$ have the same sign. Accordingly, diffraction efficiency in the long wavelength infrared region can further be improved.

By satisfying the formula (15), as described above, diffraction efficiency in the long wavelength infrared region can further be improved. It is more preferable that instead of the formula (15), the following formula (15a) is satisfied:

$$-4 < a_2/a_1 < \Phi \tag{15a}$$

By satisfying the formula (15a), the diffraction efficiency can be inhibited from decreasing due to excessive changes of $\Phi(\lambda)$ on the long wavelength side when $a_1$ and $a_2$ have different signs so that diffraction efficiency in the long wavelength infrared region can further be improved.

An absolute value $|\Delta\theta_{12,\,13}|$ of a difference between a relative partial dispersion ratio of the first diffraction grating 3 with respect to the wavelengths 12 to 13 μm and a relative partial dispersion ratio of the second diffraction grating 4 with respect to the wavelengths 12 to 13 μm preferably satisfies the following conditional expression (16):

$$0.01 < |\Delta\theta_{12,13}| < 1.2 \tag{16}$$

The relative partial dispersion ratio $\theta_1$ of the first diffraction grating 3 for the wavelengths 12 to 13 μm is a value defined by the following conditional expression (17). The relative partial dispersion ratio $\theta_2$ of the second diffraction grating 4 for the wavelengths 12 to 13 μm is a value defined by the following conditional expression (18):

$$\theta_1 = [n_1(12) - n_1(13)]/[n_1(8) - n_1(12)] \tag{17}$$

$$\theta_2 = [n_2(12) - n_2(13)]/[n_2(8) - n_2(12)] \tag{18}$$

The formula (16) specifies the range of $|\Delta\theta_{12,\,13}|$ where changes of $\Phi(\lambda)$ on the long wavelength side can effectively be corrected. As changes of the optical path length difference on the long wavelength side can be increased by making $|\Delta\theta_{12,\,13}|$ larger than the lower limit of the formula (15), and so changes of $\Phi(\lambda)$ on the long wavelength side can be corrected more effectively. By making $|\Delta\theta_{12,\,13}|$ smaller than the upper limit of the formula (15), the diffraction efficiency can be inhibited from decreasing due to excessive changes of $\Phi(\lambda)$ on the long wavelength side.

In other words, by setting $|\Delta\theta_{12,\,13}|$ to the range of the formula (16), changes of $\Phi(\lambda)$ on the long wavelength side can effectively be corrected so that diffraction efficiency on the long wavelength side can further be improved. As a result, diffraction efficiency in the long wavelength infrared region can further be improved.

The first diffraction grating 3 and the second diffraction grating 4 are not particularly limited if they are formed from materials satisfying the formula (1) described above.

In order to improve transmittance of the DOE 10 in the long wavelength infrared region, the absorption coefficient of the material for the first diffraction grating 3 and the absorption coefficient of the material for the second diffraction grating 4 are both preferably 26.66 [cm$^{-1}$] or less at the wavelength 10 μm. Such materials include germanium, silicon, chalcogenide glass, zinc selenide (ZnSe), zinc sulfide (ZnS), barium fluoride (BaF$_2$), sodium chloride (NaCl), potassium chloride (KCl), and high-density polyethylene (HDPE). High-density polyethylene is polyethylene whose density is 0.942 [kg/m$^3$] or more.

Organic materials such as HDPE can be molded by injection and so can be processed and molded more easily than inorganic materials such as germanium and silicon, and organic materials are less expensive. For example, after producing one of the first diffraction grating 3 and the second diffraction grating 4, the diffraction grating portion 2 may be obtained by molding HDPE using the produced diffraction grating as a mold to form the other diffraction grating. As a result, by forming at least one of the first diffraction grating 3 and the second diffraction grating 4 using an organic material such as high-density polyethylene (HDPE), the manufacturing cost of the DOE 10 can be reduced.

The first diffraction grating 3 or the second diffraction grating 4 may be formed using a material obtained by dispersing fine particles of an inorganic material in an organic material such as HDPE. By dispersing fine particles of an inorganic material in an organic material such as HDPE, optical constants can be adjusted. Therefore, by forming the first diffraction grating 3 or the second diffraction grating 4 using a material in which fine particles of an inorganic material are dispersed in an organic material such as HDPE, diffraction efficiency can be improved.

By making the mixing ratio of fine particles larger than 3 vol %, optical constants after mixing can easily be controlled. By making the mixing ratio of fine particles smaller than 30 vol %, optical constants can be adjusted while viscosity for easy molding is retained. For this reason, when fine particles are dispersed in an organic material such as HDPE, the mixing ratio of fine particles is preferably 3 vol % or more and 30 vol % or less.

To reduce Rayleigh scattering caused by mixing fine particles, the average particle size of fine particles is preferably set to ¼ or less of the wavelength of light incident on the diffraction grating portion 2. When a diffractive optical element is used in the long wavelength infrared region as in the case of the DOE 10 according to the present exemplary embodiment, the average particle size of fine particles may be 2.5 µm or less.

Features of the DOE 10 according to the present exemplary embodiment will be described.

In the present exemplary embodiment, the first diffraction grating 3 is formed from sodium chloride (NaCl). The refractive index of the first diffraction grating 3 is: $n_1(8)=1.51$, $n_1(10)=1.49$, and $n_1(12)=1.48$. The Abbe number $v_1(10)$ of the first diffraction grating 3 is 19.26 and the relative partial dispersion ratio at the wavelengths 12 to 13 µm is 0.34. The Abbe number $v(10)$ of a certain medium in the long wavelength infrared region is given by the following formula (19) when the refractive indexes of the medium at the wavelengths 8 µm, 10 µm, and 12 µm are N(8), N(10), and N(12), respectively:

$$v(10)=[N(10)-1]/[N(8)-N(12)] \quad (19)$$

In the present exemplary embodiment, the second diffraction grating 4 is formed from barium fluoride ($BaF_2$). The refractive index of the second diffraction grating 4 is: $n_2(8)=1.43$, $n_2(10)=1.40$, and $n_2(12)=1.37$. The Abbe number $v_2(10)$ of the second diffraction grating 4 is 7.30 and the relative partial dispersion ratio at the wavelengths 12 to 13 µm is 0.32.

By forming the DOE 10 of the first diffraction grating 3 and the second diffraction grating 4 described above, the value of the formula (1) becomes −3.19. The value of the formula (13) according to the present exemplary embodiment becomes −0.040. In other words, the DOE 10 according to the present exemplary embodiment satisfies both of the formula (1) and the formula (13). The design order of the DOE 10 according to the present exemplary embodiment is first-order. The design order refers to the diffraction order having the highest diffraction efficiency in the DOE 10. In other words, the diffraction grating portion 2 of DOE 10 is designed such that the first diffraction order has the highest diffraction efficiency across all wavelengths of the long wavelength infrared region.

Figure 5:
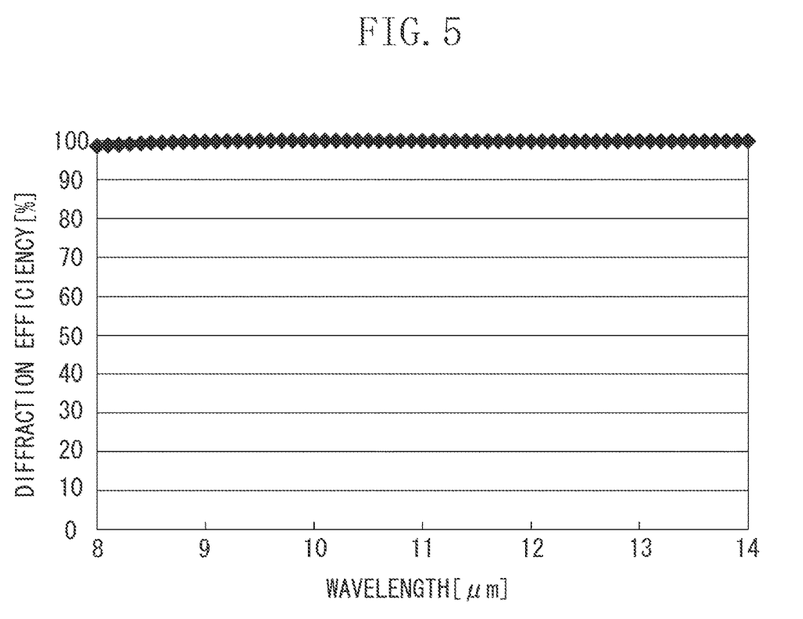
FIG. 5 is a diagram illustrating diffraction efficiency of first-order diffracted light in a diffractive optical element according to a first exemplary embodiment.

FIG. 5 illustrates the wavelength dependency of diffraction efficiency of first-order diffracted light in the long wavelength infrared region of the DOE 10 according to the present exemplary embodiment. It is evident from FIG. 5 that the diffraction efficiency of first-order diffracted light is 94% or more at the wavelengths 8 to 14 µm.

Figure 6:
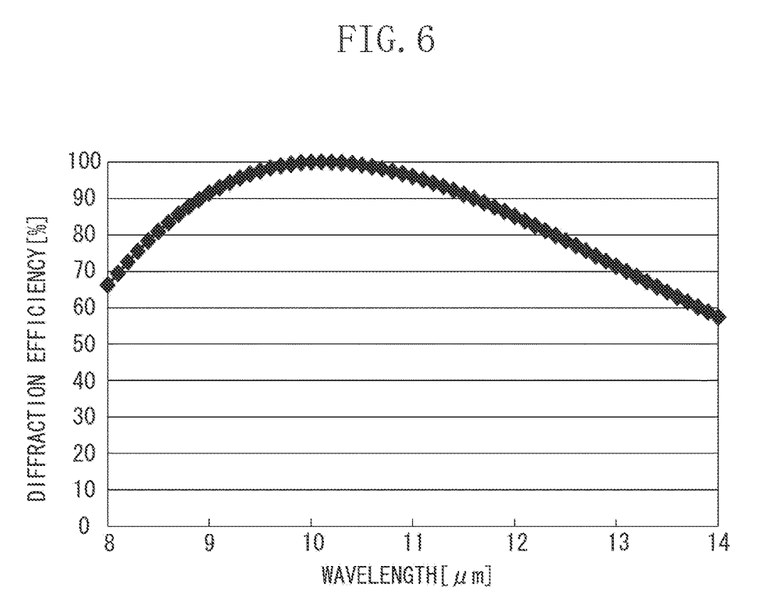
FIG. 6 is a diagram illustrating diffraction efficiency of first-order diffracted light in a diffractive optical element according to a comparative example.

FIG. 6 illustrates the wavelength dependency of diffraction efficiency of first-order diffracted light in the long wavelength infrared region of DOE according to a comparative example. The DOE according to the comparative example has the first diffraction grating 3 formed from barium fluoride ($BaF_2$) and no second diffraction grating. In other words, the portion corresponding to the second diffraction grating in the DOE according to the comparative example is air. For this reason, the DOE 10 in the comparative example does not satisfy the formula (1). It is evident from FIG. 6 that the diffraction efficiency of first-order diffracted light in the DOE according to the comparative example is substantially 100% at some of wavelengths in the long wavelength infrared region, but significantly decreases at other wavelengths.

Consequently, the diffraction efficiency in the long wavelength infrared region can be improved by adopting a configuration satisfying, like that of the DOE 10 according to the present exemplary embodiment, the formula (1).

A DOE according to a second exemplary embodiment will be described. The DOE according to the present exemplary embodiment is as illustrated in FIGS. 1 and 2 and is similar to the DOE according to the first exemplary embodiment. In the present exemplary embodiment, however, materials for the first diffraction grating 3 and the second diffraction grating 4 are different from those in the first exemplary embodiment.

In the present exemplary embodiment, the first diffraction grating 3 is formed from zinc selenide (ZnSe). The refractive index of the first diffraction grating 3 is: $n_1(8)=2.42$, $n_1(10)=2.41$, and $n_1(12)=2.39$. The Abbe number $v_1(10)$ of the first diffraction grating 3 is 57.41 and the relative partial dispersion ratio at the wavelengths 12 to 13 µm is 0.33.

In the present exemplary embodiment, the second diffraction grating 4 is formed from zinc sulfide (ZnS). The refractive index of the second diffraction grating 4 is: $n_2(8)=2.22$, $n_2(10)=2.20$, and $n_2(12)=2.17$. The Abbe number $v_2(10)$ of the second diffraction grating 4 is 20.59 and the relative partial dispersion ratio at the wavelengths 12 to 13 µm is 0.51.

In the present exemplary embodiment, the value of the formula (1) is −6.09. The value of the formula (13) according to the present exemplary embodiment is −1.413. In other words, the DOE 10 in the present exemplary embodiment satisfies both of the formula (1) and the formula (13). The design order of the DOE 10 according to the present exemplary embodiment is first-order.

Figure 7:
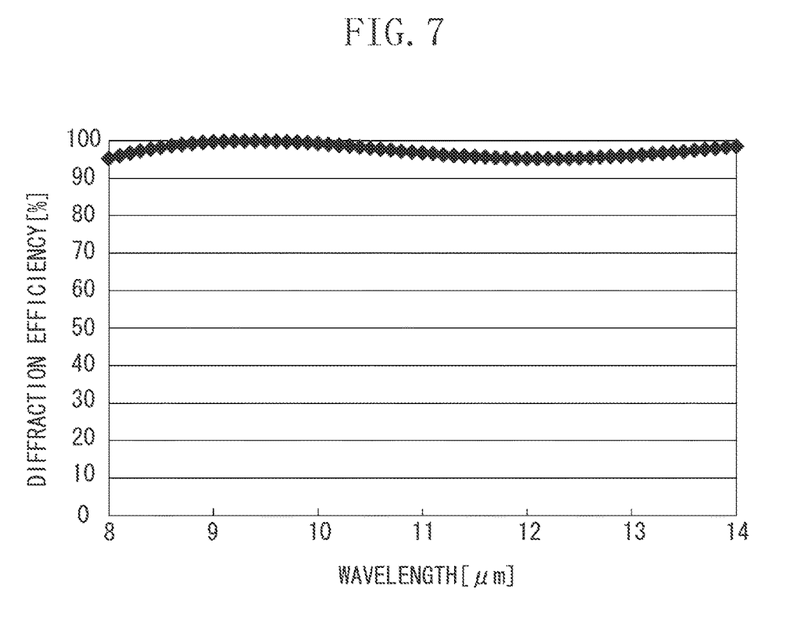
FIG. 7 is a diagram illustrating diffraction efficiency of first-order diffracted light in a diffractive optical element according to a second exemplary embodiment.

FIG. 7 illustrates the wavelength dependency of diffraction efficiency of first-order diffracted light in the long wavelength infrared region of the DOE 10 according to the present (second) exemplary embodiment. It is evident from FIG. 7 that the diffraction efficiency of first-order diffracted light is 94% or more at the wavelengths 8 to 14 µm. In other words, by adopting a configuration satisfying, like that of the DOE 10 according to the present exemplary embodiment, the formula (1), the diffraction efficiency across all wavelengths of the long wavelength infrared region can be improved.

Zinc selenide (ZnSe) and zinc sulfide (ZnS) are both materials that can be molded by molding or sintering. Accordingly, the cost for producing the DOE 10 can be reduced by adopting a configuration like the configuration of the DOE 10 according to the present exemplary embodiment.

Next, A DOE according to a third exemplary embodiment will be described. The DOE according to the present exemplary embodiment is as illustrated in FIGS. 1 and 2 and is similar to the DOE according to the first and second exemplary embodiments. The material for the second diffraction grating 4 is similar to that in the first exemplary embodiment. However, the material for the first diffraction grating 3 in the present exemplary embodiment is different from that in the first exemplary embodiment.

In the present exemplary embodiment, the first diffraction grating 3 is formed from high-density polyethylene (HDPE). The refractive index of the first diffraction grating 3 is: $n_1(8)=1.52$, $n_1(10)=1.51$, and $n_1(12)=1.51$. The Abbe number $v_1(10)$ of the first diffraction grating 3 is 91.91 and the relative partial dispersion ratio at the wavelengths 12 to 13 µm is 1.13.

In the present (third) exemplary embodiment, the second diffraction grating 4 is formed from barium fluoride ($BaF_2$).

The refractive index of the second diffraction grating 4 is: $n_2(8)=1.43$, $n_2(10)=1.40$, and $n_2(12)=1.37$. The Abbe number $v_2(10)$ of the second diffraction grating 4 is 7.30 and the relative partial dispersion ratio at the wavelengths 12 to 13 μm is 0.32.

In the present exemplary embodiment, the value of the formula (1) is −2.30, and the value of the formula (13) is −0.004. In other words, the DOE 10 according to the present exemplary embodiment satisfies both of the formula (1) and the formula (13). The design order of the DOE 10 according to the present exemplary embodiment is first-order.

Figure 8:
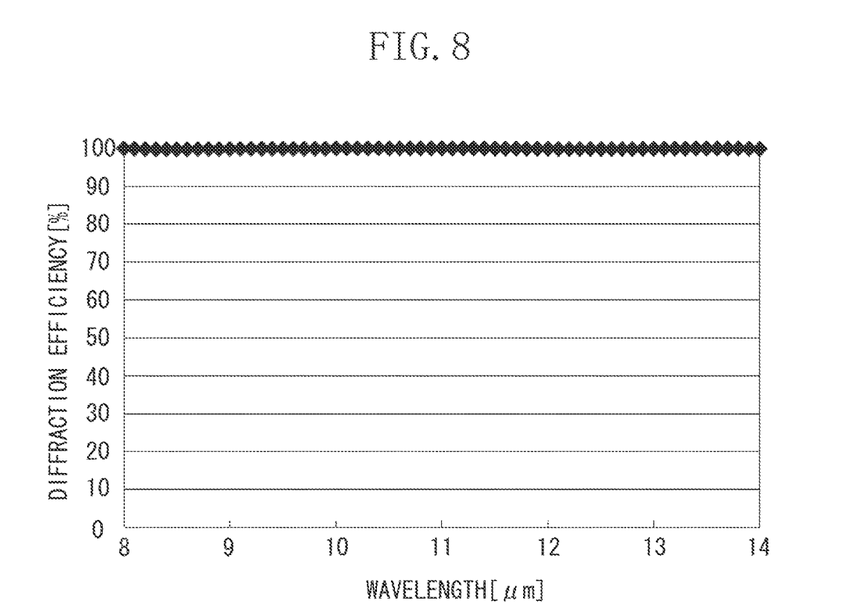
FIG. 8 is a diagram illustrating diffraction efficiency of first-order diffracted light in a diffractive optical element according to a third exemplary embodiment.

FIG. 8 illustrates the wavelength dependency of diffraction efficiency of first-order diffracted light in the long wavelength infrared region of the DOE 10 according to the present exemplary embodiment. It is evident from FIG. 8 that the diffraction efficiency of first-order diffracted light is 94% or more at the wavelengths 8 to 14 μm. In other words, by adopting a configuration satisfying, like that of the DOE 10 according to the present exemplary embodiment, the formula (1), the diffraction efficiency in the long wavelength infrared region can be improved.

HDPE is, as described above, inexpensive and can easily be processed and molded. For this reason, the cost for producing the DOE 10 can be reduced by adopting a configuration like that of the DOE 10 according to the present exemplary embodiment.

A DOE according to a fourth exemplary embodiment will be described. The DOE according to the present exemplary embodiment is as illustrated in FIGS. 1 and 2 and is similar to the DOE according to the first and second exemplary embodiments. In the present exemplary embodiment, however, materials for the first diffraction grating 3 and the second diffraction grating 4 are different from those in the first to third exemplary embodiments.

The first diffraction grating 3 according to the present exemplary embodiment is formed from a material obtained by dispersing by 30 vol % fine particles made of zinc selenide (ZnSe) used for the first diffraction grating according to the second exemplary embodiment in high-density polyethylene (HDPE) used for the first diffraction grating 3 according to the third exemplary embodiment. The refractive index of the first diffraction grating 3 is: $n_1(8)=1.83$, $n_1(10)=1.83$, and $n_1(12)=1.82$. The Abbe number $v_1(10)$ of the first diffraction grating 3 is 64.22 and the relative partial dispersion ratio at the wavelengths 12 to 13 μm is 0.54.

The second diffraction grating 4 according to the present exemplary embodiment is formed from a material obtained by dispersing by 29.9 vol % fine particles made of zinc sulfide (ZnS) used for the first diffraction grating 3 according to the second exemplary embodiment in high-density polyethylene (HDPE) used for the first diffraction grating 3 according to the third exemplary embodiment. The refractive index of the second diffraction grating 4 is: $n_2(8)=1.76$, $n_2(10)=1.75$, and $n_2(12)=1.73$. The Abbe number $v_2(10)$ of the second diffraction grating 4 is 29.57 and the relative partial dispersion ratio at the wavelengths 12 to 13 μm is 0.59.

In the present exemplary embodiment, the value of the formula (1) is −6.48, and the value of the formula (13) is −1.613. In other words, the DOE 10 according to the present exemplary embodiment satisfies both of the formula (1) and the formula (13). The design order of the DOE 10 according to the present exemplary embodiment is first-order of diffraction.

Figure 9:
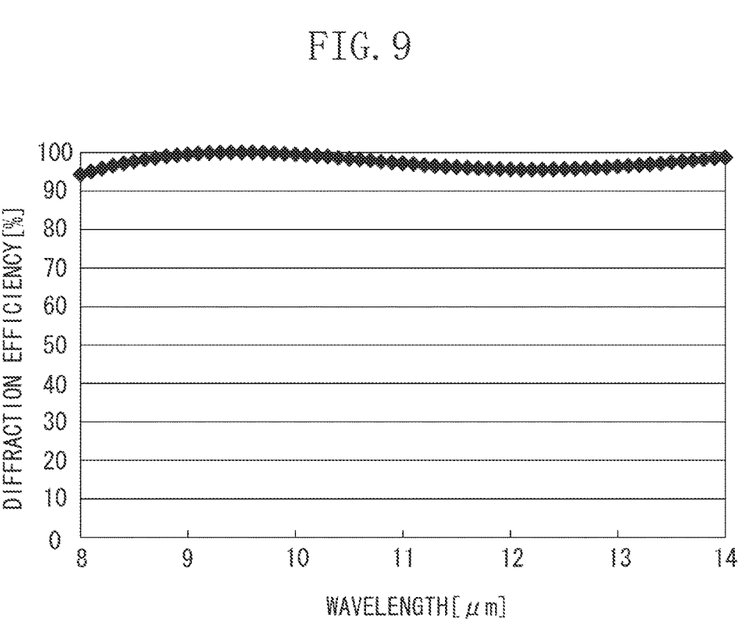
FIG. 9 is a diagram illustrating diffraction efficiency of first-order diffracted light in a diffractive optical element according to a fourth exemplary embodiment.

FIG. 9 illustrates the wavelength dependency of diffraction efficiency of first-order diffracted light in the long wavelength infrared region of the DOE 10 according to the present exemplary embodiment. It is evident from FIG. 9 that the diffraction efficiency of first-order diffracted light is 94% or more at the wavelengths 8 to 14 μm. In other words, by adopting a configuration satisfying, like that of the DOE 10 according to the present exemplary embodiment, the formula (1), the diffraction efficiency in the long wavelength infrared region can be improved.

Values in the first to fourth exemplary embodiments described above are listed in Table 1.

TABLE 1

| | First diffraction grating 3 | | Second diffraction grating 4 | | | | |
| --- | --- | --- | --- | --- | --- | --- | --- |
| | Material | Absorption coefficient [cm$^{-1}$] | Material | Absorption coefficient [cm$^{-1}$] | Formula (1) | Formula (13) | Formula (16) |
| First exemplary embodiment | NaCl | 0.00 | BaF$_2$ | 0.12 | −3.19 | −0.040 | 0.017 |
| Second exemplary embodiment | ZnSe | 0.00 | ZnS | 0.01 | −6.09 | −1.413 | 0.179 |
| Third exemplary embodiment | HDPE | 7.53 | BaF$_2$ | 0.12 | −2.3 | −0.004 | 0.809 |
| Fourth exemplary embodiment | HDPE + ZnSe | 5.27 | HDPE + ZnS | 5.27 | −6.48 | −1.613 | 0.059 |

An optical system according to a fifth exemplary embodiment will be described. It is known that chromatic aberration of an optical system can be reduced by using both of a refractive optical element and a DOE. The optical system according to the present exemplary embodiment also reduces chromatic aberration by a DOE.

Figure 10:
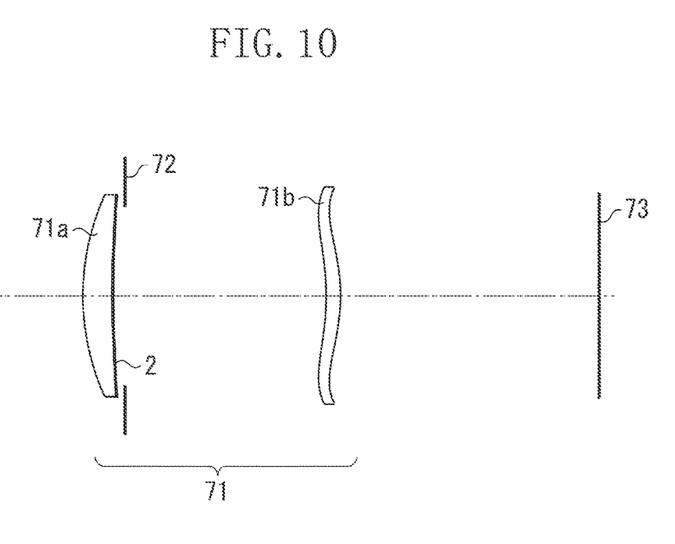
FIG. 10 is a schematic diagram of an optical system according to a fifth exemplary embodiment.

FIG. 10 is a schematic diagram of an optical system according to the present exemplary embodiment. An optical system 71 according to the present exemplary embodiment includes a plurality of lenses as a plurality of optical elements including optical elements 71a and 71b. FIG. 10 illustrates a diaphragm 72 and an image forming surface 73 which is located at an image plane of the optical system 71.

In the present exemplary embodiment, the optical element 71a is a DOE and is provided with the diffraction grating portion 2 on the image side of the optical element. The DOE 71a has features similar to those of the DOE 10 according to any of the first to fourth exemplary embodiments.

As described in the first to fourth exemplary embodiments, the DOE 71a according to the present exemplary embodiment has high diffraction efficiency for first-order diffracted light in the long wavelength infrared region. For this reason, the optical system 71 according to the present exemplary embodiment can reduce the generation of flare artifacts so that a high-quality image can be obtained.

In the present exemplary embodiment, an example of the optical system 71 including one DOE is described, but the optical system 71 is not limited to such example. The optical system 71 may include a plurality of DOEs.

Next, an image pickup apparatus according to a sixth exemplary embodiment is described.

Figure 11:
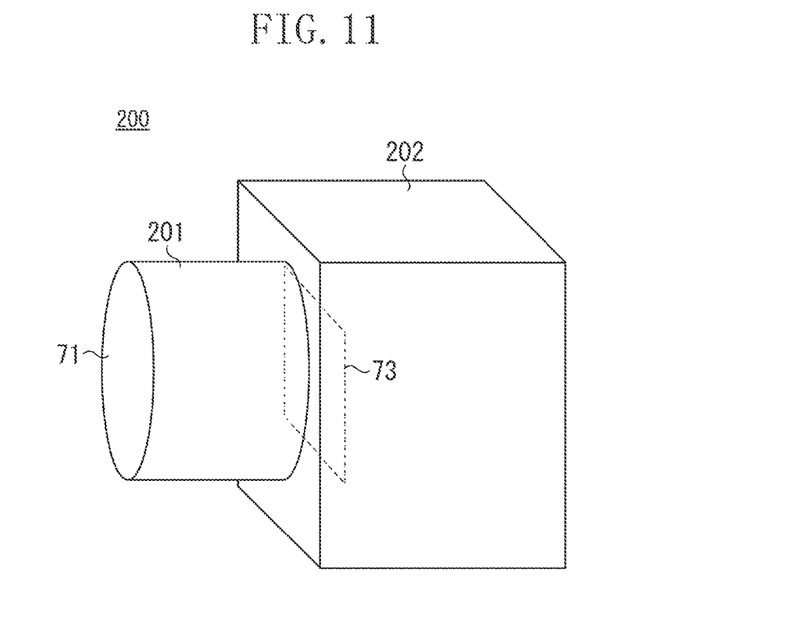
FIG. 11 is a schematic diagram of an image pickup apparatus according to a sixth exemplary embodiment.

FIG. 11 illustrates an image pickup apparatus 200 according to the present exemplary embodiment. The image pickup apparatus 200 is an image pickup apparatus, such as a thermograph and a night vision camera, that forms an image by receiving long wavelength infrared rays. The image pickup apparatus 200 includes a lens unit 201 and a body 202. The lens unit 201 includes the optical system 71 as described above according to the fifth exemplary embodiment. The body 202 includes an image sensor having sensitivity in the long wavelength infrared region; the image sensor is arranged on the image forming surface 73 which corresponds to an image plane of the optical system 71.

When the digital camera is used as an example of the image pickup apparatus 200 including the optical system 71, a high-quality image in which the generation of flares is reduced can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-156964, filed Aug. 9, 2016, which is hereby incorporated by reference herein in its entirety.

What is claimed is:

1. A diffractive optical element comprising:
a first diffraction grating; and
a second diffraction grating,
wherein when a refractive index of the first diffraction grating at wavelength $\lambda$ [μm] is $n_1(\lambda)$ and a refractive index of the second diffraction grating at the wavelength $\lambda$ [μm] is $n_2(\lambda)$, a conditional expression $$-50 < \frac{n_1(10) - n_2(10)}{n_1(8) - n_2(8) - (n_1(12) - n_2(12))} < -1.3$$

is satisfied.

2. A diffractive optical element comprising:
a first diffraction grating; and
a second diffraction grating,
wherein when a refractive index of the first diffraction grating at wavelength $\lambda$ [μm] is $n_1(\lambda)$ and a refractive index of the second diffraction grating at the wavelength $\lambda$ [μm] is $n_2(\lambda)$, conditional expressions $$0.616 < [n_1(8) - n_2(8)]/[n_1(10) - n_2(10)] < 0.984, \text{ and}$$

$$0.924 < [n_1(12) - n_2(12)]/[n_1(10) - n_2(10)] < 1.476$$

are satisfied.

3. The diffractive optical element according to claim 2, wherein the first diffraction grating and the second diffraction grating are both blazed diffraction gratings.

4. The diffractive optical element according to claim 2, wherein a conditional expression $$-20 < \left(\frac{n_1(10) - n_2(10)}{n_1(8) - n_2(8) - (n_1(12) - n_2(12))} + 2.5\right) \times \left(\frac{n_1(12) - n_2(12) - (n_1(13) - n_2(13))}{n_1(8) - n_2(8) - (n_1(12) - n_2(12))} - 0.25\right) < 0.37$$

is satisfied.

5. The diffractive optical element according to claim 2, wherein when $f(\lambda)$ is defined by $f(\lambda)=[n_1(\lambda)-n_2(\lambda)]/\lambda$, a coefficient of $\lambda$ when $f(\lambda)$ is linearly approximated with respect to $\lambda$ in a wavelength band of 8 μm or more and 12 μm or less is $a_1$, and a coefficient of $\lambda$ when $f(\lambda)$ is linearly approximated with respect to $\lambda$ in the wavelength band of 12 μm or more and 13 μm or less is $a_2$, a conditional expression $$a_2/a_1 < 1$$

is satisfied.

6. The diffractive optical element according to claim 2, wherein when a relative partial dispersion ratio $\theta_1$ of the first diffraction grating with respect to the wavelength 12 to 13 μm and a relative partial dispersion ratio $\theta_2$ of the second diffraction grating with respect to the wavelength 12 to 13 μm are defined as $$\theta_1 = [n_1(12) - n_1(13)]/[n_1(8) - n_1(12)]$$

$$\theta_2 = [n_2(12) - n_2(13)]/[n_2(8) - n_2(12)],$$

an absolute value $|\Delta\theta_{12,13}|$ of a difference between $\theta_1$ and $\theta_2$ satisfies a conditional expression $$0.01 < |\Delta\theta_{12,13}| < 1.2.$$

7. The diffractive optical element according to claim 2, wherein an absorption coefficient of the first diffraction grating and an absorption coefficient of the second diffraction grating are both 26.66 [cm$^{-1}$] or less at the wavelength 10 μm.

8. The diffractive optical element according to claim 2, wherein the first diffraction grating and the second diffraction grating are both concentric diffraction gratings.

9. The diffractive optical element according to claim 2, wherein the diffractive optical element is a lens formed by arranging the first diffraction grating and the second diffraction grating in close contact with each other.

10. The diffractive optical element according to claim 2, wherein at least one of the first diffraction grating and the second diffraction grating includes an organic material.

11. The diffractive optical element according to claim 10, wherein at least one of the first diffraction grating and the second diffraction grating includes high-density polyethylene.

12. The diffractive optical element according to claim 10, wherein at least one of the first diffraction grating and the second diffraction grating is formed from a material obtained by dispersing fine particles of an inorganic material in the organic material.

13. The diffractive optical element according to claim 12, wherein an average particle size of the fine particles is 2.5 μm or less.

14. An optical system including a plurality of optical elements, wherein at least one of the optical elements is a diffractive optical element,
the diffractive optical element includes:
a first diffraction grating; and
a second diffraction grating, and
when a refractive index of the first diffraction grating at wavelength $\lambda$ [μm] is $n_1(\lambda)$ and the refractive index of the second diffraction grating at the wavelength $\lambda$ [μm] is $n_2(\lambda)$, conditional expressions $$0.616<[n_1(8)-n_2(8)]/[n_1(10)-n_2(10)]<0.984, \text{ and}$$

$$0.924<[n_1(12)-n_2(12)]/[n_1(10)-n_2(10)]<1.476$$

are satisfied.

* * * * *